United States Patent [19]

Cecchini

[11] Patent Number: 4,643,583
[45] Date of Patent: Feb. 17, 1987

[54] ICE CREAM MAKING MACHINE INCORPORATING A COLD STORAGE CONTAINER

[76] Inventor: Valerio Cecchini, Via A. Gramsci 11, Ravenna, Italy

[21] Appl. No.: 687,229

[22] Filed: Dec. 28, 1984

[30] Foreign Application Priority Data

Jul. 27, 1984 [IT] Italy ................. 3544 A/84

[51] Int. Cl.$^4$ ............................................. A23G 9/00
[52] U.S. Cl. ........................................ 366/149; 62/343; 99/455; 366/230
[58] Field of Search ............. 366/144, 145, 147, 149, 366/219, 220, 221, 224, 225, 230, 231; 62/342, 343; 99/452, 453, 455

[56] References Cited

U.S. PATENT DOCUMENTS

| | | | |
|---|---|---|---|
| 3,046,755 | 7/1962 | Sale | 62/343 X |
| 3,630,493 | 12/1971 | Carpigiani | 366/149 |
| 3,952,538 | 4/1976 | Warlick | 62/342 |
| 4,332,485 | 6/1982 | Woodman | 366/231 X |
| 4,429,549 | 2/1984 | Randolphi | 62/342 |
| 4,488,817 | 12/1984 | Uesaka et al. | 366/293 X |

*Primary Examiner*—Timothy F. Simone
*Attorney, Agent, or Firm*—Guido Modiano; Albert Josif

[57] ABSTRACT

This invention relates to an ice cream making machine which comprises a motor unit operative to rotatively drive a cold storage container whereinto the the mixture to be whisked is introduced. The container includes an inner metal vessel around which an outer case is provided to define a space therebetween. A eutectic liquid is introduced into said space which, when brought to freezing temperature, is effective to keep the vessel at a nearly constant temperature which ensures whisking of the ice cream mixture. The container outer case has a bottom which is expandable relatively to the inner vessel to accommodate expansion taking place during the change of state of the eutectic liquid.

18 Claims, 3 Drawing Figures

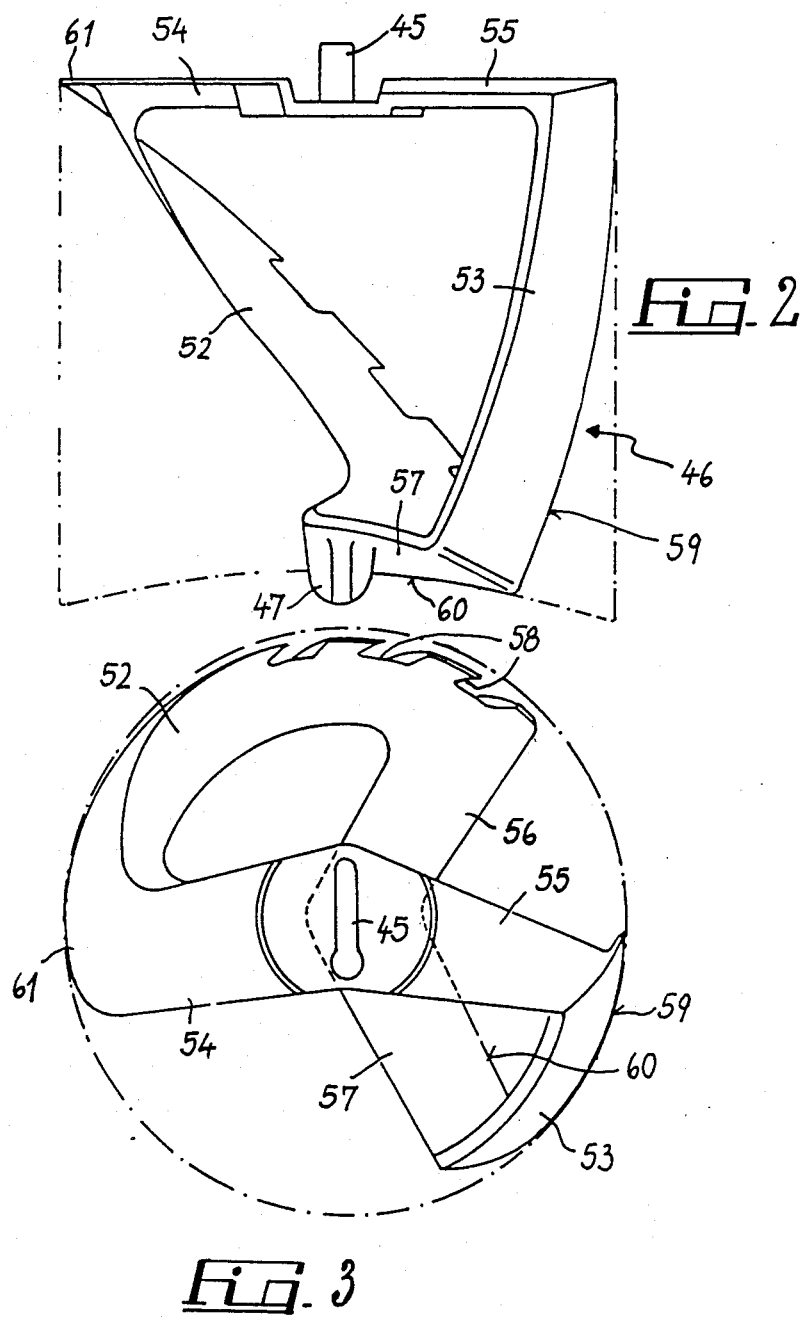

ICE CREAM MAKING MACHINE INCORPORATING A COLD STORAGE CONTAINER

BACKGROUND OF THE INVENTION

This invention relates to an ice cream making machine incorporating a cold storage container.

Ice making machines for household use which are presently commercially available, may be classed in two general types: a first type comprises a container for the mixture to be whisked, adapted for application to a motor unit driving a stirring paddle revolving inside the container. The required whisking temperature is achieved by placing the motor unit and container attached thereto in a refrigerating medium. A second machine type comprises, additionally to the container and motor unit, a small refrigerating system dimensioned to keep the container at the whisking temperature.

Both such prior machines have some deficiencies which are made apparent, for those of the first type, by a significantly low refrigerating power, and for those of the second type, by a fairly complex construction involving excessively high manufacturing costs in relation to the particular category of users for whom they are intended. Other disadvantages of prior machines are to be seen in that visual monitoring of the whisking process, use of the container outside of the refrigerating medium, and effectuation of different ice cream tastes are not allowed.

SUMMARY OF THE INVENTION

It is the technical aim of this invention to provide an ice cream making machine whereby the above-listed drawbacks and disadvantages of prior machines can be substantially overcome.

Within this general aim, it is an object of this invention to provide a machine which can neutralize the effects of temperature changes on the structure.

The above aim and object are achieved by an ice cream making machine characterized in that it comprises a motor unit driving a container composed of a metal vessel set rotatable about an inclined axis from the vertical, wherein a stationary stirrer is positioned, and of an outer case defining a sealed space therebetween, said sealed space containing a eutectic liquid and the bottom of said outer case being adapted to accommodate the expansion occurring as the state of the eutectic liquid is changed.

BRIEF DESCRIPTION OF THE DRAWINGS

Further features of the invention will be more clearly understood from the following description of one embodiment thereof, with reference to the accompanying illustrative drawing, where:

FIGS. 2 and 3 are elevation and plan views, respectively, of the stirrer.

DESCRIPTION OF THE PREFERRED EMBODIMENTS

Figure 1:
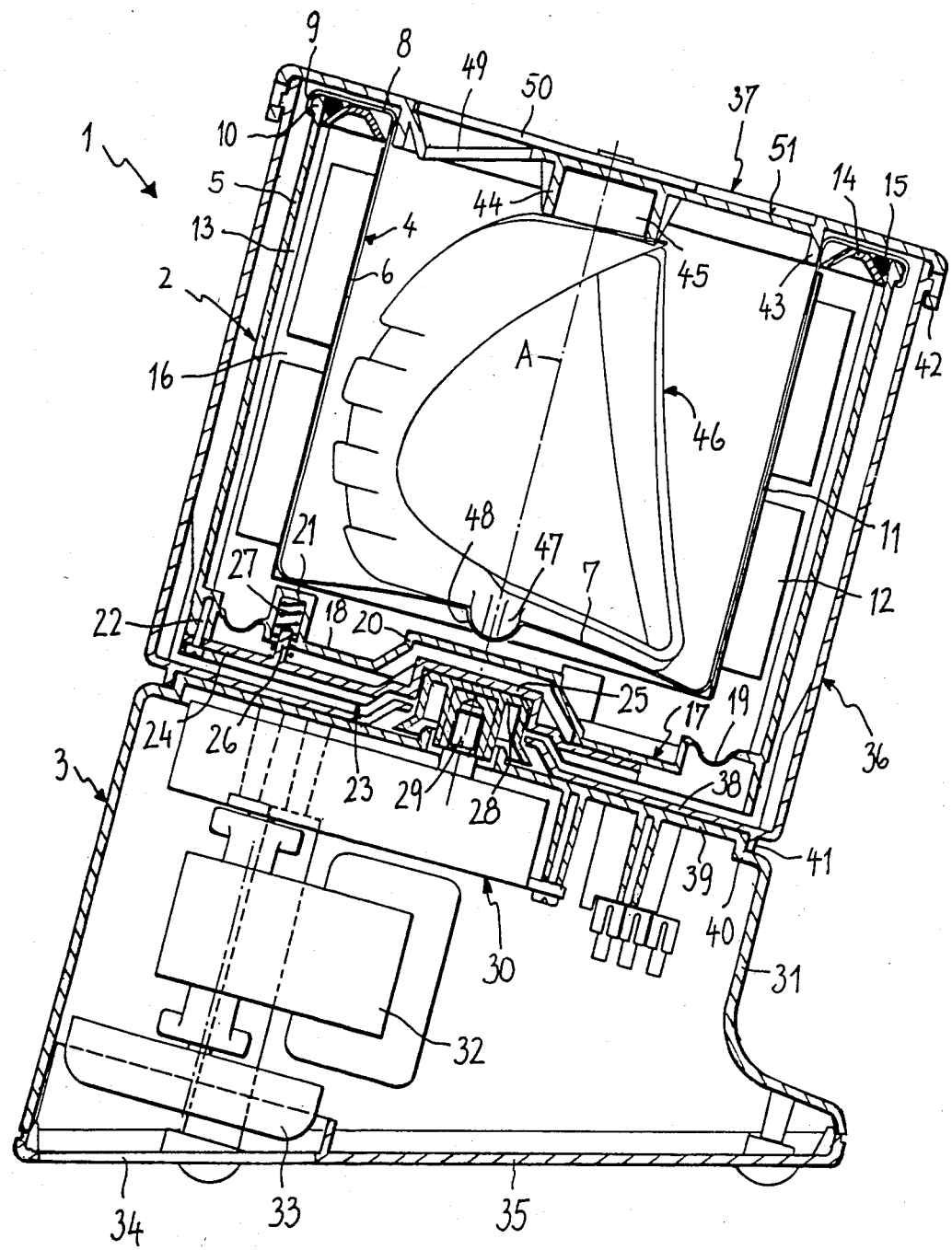
FIG. 1 is an elevation view of a machine taken on the axial plane.

With reference to FIG. 1, indicated at 1 is the machine as a whole. It comprises a cylindrical container 2 associated with a motor unit 3. The container 2 includes an inner vessel 4 and outer case 5. The vessel 4 is formed from metal, preferably by stainless steel sheet metal forming, and comprises a wall 6 of cylindrical configuration which is closed at the bottom by an inwardly crowned bottom 7.

Outwardly from the top edge of the wall 6 there extends a horizontal flange or annulus 8 which has a peripheral lip 9 which extends downwards and then inwards to engage with a collar 10 formed externally along the top edge or rim of the case 5.

Applied to the cylindrical wall 6 throughout the height thereof and in close contact therewith, is a metal foil 11 wherefrom fins 12 extend radially outwards which are apt to increase the thermal exchange surface area.

The outer case 5 is formed interiorly with longitudinal ribs 13 which form, in the vicinity of the flange 8, a bearing step for a ring 14 having an isosceles trapezoidal radial section configuration. Received in the channel defined between the ring 14, case 5 and flange 8, is a rubber ring 15 effective to seal the joint between the case 5 and flange 8.

Between the inner vessel 4 and outer case 5, a space 16 is defined whereinto a conventional eutectic liquid is introduced. The space is closed by a bottom 17 formed integrally with the case 5.

More specifically, the bottom 17 comprises a center portion 18 which is connected to the base of the case 5 by an annular portion 19.

The center portion 18 has a center recess 20 and a tern of bushings 21 distributed at equal angles around the rotation axis A of the container which, for reasons discussed hereinafter, is inclined from the vertical.

The bushings 21 define blind holes which are open downwardly. Whereas the portion 18 is substantially rigid, the annular portion 19 is flexible, thereby the portion 18 can move relatively to the bottom 7 of the vessel 4.

Fastened, as by screws 22, to the bottom edge of the case 5 are the ends of a bracket 23 having three arms 24 arranged to be angularly displaced at 120° apart from each other. The arms 24 are suitably strengthened by ribs extending from a center cup 25 of sort which, with the bracket in its assembled condition, would be received into the recess 20. The arms 24 are provided, on their sides facing facing the bottom 17, with axial pegs 26 which protrude into the bushings 21 and serve as guides for springs 27 housed in the bushings 21 and acting against the bottom 17 to move it closer to the bottom 7 of the vessel 4.

The cup 25 has an hexagonal configuration for prismatic engagement by a spindle 28 for rotatively driving the container 2. The spindle 28 is threaded onto the output shaft 29 of a reduction gear 30 mounted inwards of the base 31 of the assembly 3. The input end of the gear 30 is connected to an electric motor 32 having a fan 33 which draws cooling air through a grid 34 formed in the plate 35 which closes the bottom of the base 31. In order to keep the axis A of the container 2 aligned with that of the spindle 28, a cylindrical drum 36 is provided which is closed at the top by a lid 37 and completely encloses the container 2. The drum 36 includes a bottom 38 adapted to rest on the inclined top face 39 of the base 31. Around the bottom 38 there extends a centering collar 41 on a circular step 40 formed on the inclined face 39. To make the drum 36 rigid with the base 31, a bayonet coupling is provided between the collar 41 and step 40, which coupling is quite conventional, and therefore not shown.

The lid 37 has a peripheral rim 42 which is adapted to cover the exterior of the top edge of the drum 36, wherewith it is associable through a further coupling of the bayonet type. For centering the lid 37 to the container 2, a collar 43 is provided which slides peripherally on the surface of the vessel 4.

The lid, moreover, is formed centrally with a polygonal bushing 44 for the accomplishment of an axially slideable fit of a shank 45 of a stirrer 46 placed stationary inside the vessel 40. The stirrer is positioned along the axis A, additionally to the engagement of the prismatic shank 45 in the bushing 44, by a boss 47 engaging in a corresponding seat 48 in the bottom 7 of the vessel 4.

The mixture to be blended is introduced into the container through an opening 49 in the lid 37 which may be closed by means of a small door 50 sliding in a slideway 51 formed diametrically in the lid 37.

The mode of operation of the machine just described is as follows. The container 2, separate from the motor unit 3, is put into an ordinary household deep freezer where it stores a preset amount of refrigeration energy (frigories) dependent on the type of the eutectic solution being used. After a required time period for storing said energy, the container 2 is taken out of the freezer and applied to the unit 3 such that the spindle 28 will engage with the cup 25. Then the stirrer 46 is inserted and the lid 37 of the container closed.

At this point, after introducing the ice cream mixture through the opening 49, the motor unit 3 is energized whose operation causes the container 2 to rotate relatively to the stirrer 46, being prevented from rotating by the lid 37 secured on the stationary drum 36. Thus, the top of the container 2 will turn relatively to the lid 37 sliding with its top on the collar 43.

Once the ice cream has been formed, the container 2 is removed from the motor unit which in the meantime has been stopped. To this aim, the lid 37 and stirrer 46 are removed and the container is taken out of the drum. It should be noted that, owing to the particular nature of the eutectic liquid and the tilted attitude of the vessel 4, the blending step takes place at a practically constant temperature until the ice cream is completed. Maintenance of the temperature in the vessel 4 at that of the eutectic liquid is ensured by the intimate contact provided and by the fins 12 favoring the thermal exchange. The removed container may be utilized as a storage vessel to keep the ice cream at the appropriate temperature until the stored refrigeration energy is fully spent.

It is a basic feature of this invention that thermal expansion occurring as the eutectic liquid changes from the liquid state to the solid one can be neutralized such as results in increased volume which, in this invention, is accommodated by the yielding ability of the bottom 17. The use of the flexible annular portion 19 permits the bottom 17 and case 5 to be molded as a single piece from a plastic material, while application of the bracket 23 allows the alignment of the drive spindle 28 to the spindle receiving seat, i.e. the cup 25, to be kept true.

The advantages afforded by the container described in the foregoing are apparent. Actual tests have shown that the amount of stored energy can, by virtue of the properties of the eutectic liquid, ensure preservation of the ice cream at a constant temperature even several hours after its thorough blending. Further, by using a single motor unit and a number of different containers, one can effect different taste ice creams.

To provide an effective blending, the stirrer 46 comprises a spreading blade 52 and doctoring blade 53 connected to each other, at the top, by arms 54,55, and at the bottom, by arms 56,57. The spreading blade 52 has a cylindrical helix pattern and superimposed grooves 58 serving the function of stimulating increased oxygenation of the ice cream mixture during blending. The doctoring blade 53 also has a helical cylindrical pattern, set at a steeper angle than the spreading blade, and has a cutting edge 59 facing the tail of the paddle 2 which extends on the corresponding lower arm 57, where it is indicated at 60. As the stirrer 46 rotates in the vessel 4 the cutting edges 59 and 60 will scrape the inside wall 6 and bottom 7, while the blade 52 is held away from the wall 6 to spread the ice cream across it. To ensure centering of the stirrer 46 in the vessel 4, an upper lip 61 is provided tangentially to the wall 6.

I claim:

1. An ice cream making machine comprising a motor unit having an output shaft, a container, at least one sealed space, eutectic liquid, at least one stirrer and means for removably associating said container with said output shaft of said motor unit, said container comprising at least an inner vessel having a vessel bottom and a vessel wall and an outer case having a bottom and a cylindrical wall, said at least one sealed space being defined between said cylindrical wall of said outer case and said vessel wall, and between said bottom of said outer case and said vessel bottom, said eutectic liquid being contained within said sealed space, said container further comprising means for accommodating expansion of said eutectic liquid, said at least one stirrer being adapted for being held stationary within said inner vessel of said container, said motor unit being adapted for causing rotational movement of said container about a rotation axis.

2. An ice cream making machine according to claim 1 wherein said means for accommodating expansion of said eutectic liquid comprise a substantially flexible annular portion, and wherein said cylindrical wall of said outer case comprises an upper rim and a lower portion, said substantially flexible annular portion being adapted for connecting said bottom of said outer case, to said lower portion of said cylindrical wall.

3. An ice cream making machine according to claim 1 wherein said means for associating said container with said output shaft of said motor unit comprises a bracket, said bracket being adapted for driving engagement relationship with said output shaft of said motor unit and adapted to be held stationary with respect to said bottom of said outer case.

4. An ice cream making machine according to claim 1 wherein said means for associating said container with said output shaft of said motor unit comprises a bracket having radial arms, pegs, and a cup-like element, and wherein said bottom of said outer case comprises bushings, said cup-like element being adapted for driving engagement relationship with said output shaft of said motor unit, said radial arms extending outwards radially from said cup-like element, said bushings defining downwardly open blind holes, at least one of said pegs being rigidly associated with and protruding upwardly from each of said radial arms, each of said bushings being adapted for at least partially accommodating at least one of said pegs.

5. An ice cream making machine according to claim 1 further comprising biasing means, said biasing means being adapted for biasing said bottom of said outer case towards said vessel bottom.

6. An ice cream making machine according to claim 5 wherein said biasing means comprises cylindrical springs, each of said bushings being adapted for at least partially accommodating at least one of said cylindrical springs, each of said pegs being adapted for acting as a guide for at least one of said cylindrical springs, said cylindrical springs each being located at one of said pegs and at least partially accommodated in one of said bushings to act between said bushing and said radial arm for biasing said bottom of said outer vessel away from said radial arm and toward said vessel bottom.

7. An ice cream making machine according to claim 1 further comprising a guide collar, a drum and a lid, said drum being adapted for substantially enclosing said container, said lid being adapted for sealing engagement relationship with said drum, said stirrer being rigidly associable with said lid, said guide collar being rigidly associated with said lid and adapted for sliding contact relationship with said inner vessel for centring said lid and said stirrer with respect to said rotation axis of said container.

8. An ice cream making machine according to claim 1 wherein said inner vessel defines a thermal exchange surface area of contact with said eutectic liquid contained in said sealed space, and wherein said inner vessel further comprises fins, said fins being rigidly associated with and projecting outwardly from said inner vessel into said sealed space, said fins being adapted for increasing said thermal exchange surface area of contact of said inner vessel with said eutectic liquid contained in said space.

9. An ice cream making machine according to claim 8 further comprising a metal foil, said metal foil being applied to said inner vessel and defining said fins.

10. An ice cream making machine according to claim 1 wherein said inner vessel defines a top edge and wherein said outer case defines an upper rim, said container further comprising a substantially horizontal flange, a peripheral lip, and a collar, said collar protruding outwardly from said upper rim, said substantially horizontal flange extending from said top edge to said upper rim, said peripheral lip being rigidly associated with said substantially horizontal flange, extending downwards therefrom and engaging said collar in sealed engagement relationship therewith, said container further comprising sealing means, said sealing means being adapted for upwardly sealing said sealed space beneath said substantially horizontal flange.

11. An ice cream making machine according to claim 9 wherein said outer case has rigidly interiorly associated therewith longitudinal ribs and wherein said sealing means comprise a ring, a channel, and a sealing ring, said longitudinal ribs defining below said substantially horizontal flange a bearing step, said bearing step being adapted for supporting said ring in contact engagement relationship with said substantially horizontal flange, said channel being defined below said substantially horizontal flange between said ring and said outer case, said sealing ring being located in said channel for sealing abutment engagement with said outer case and said substantially horizontal flange.

12. An ice cream making machine according to claim 9 wherein said sealing means comprise a ring, said ring having an isoscles trapezoidal configuration.

13. An ice cream making machine according to claim 1 wherein said rotation axis is inclined with respect to a vertical plane.

14. An ice cream making machine according to claim 1 wherein said stirrer comprises a spreading blade having a top end and a bottom end, a doctoring blade having a top end and a bottom end, and arms, said top end of said spreading blade being connected to said top end of said doctoring blade by at least one of said arms, said bottom end of said spreading blade being connected to said bottom end of said doctoring blade by at least one of said arms, said spreading blade defining a cylindrical helix pattern.

15. An ice cream making machine according to claim 14 further comprising superimposed grooves, said superimposed grooves being formed on said spreading blade.

16. An ice cream making machine according to claim 14 wherein said doctoring blade further comprises a cutting edge, said cutting edge being adapted for scraping said bottom of said inner vessel.

17. An ice cream making machine according to claim 14 wherein said doctoring blade is angularly offset with respect to said spreading blade, said doctoring blade being set at a steeper angle than said spreading blade.

18. An ice cream making machine according to claim 1 wherein said bottom of said inner vessel defines an inwardly crowned portion, said inwardly crowned portion having a centre and comprising a seat, said seat being located at said centre of said inwardly crowned portion and adapted for rotatably supporting said stirrer, said sealed cavity extending below said inwardly crowned portion.

* * * * *